United States Patent [19]

Stromsta et al.

[11] 4,367,505
[45] Jan. 4, 1983

[54] MAGNETIC HEAD ASSEMBLY WITH SKEWED READ/WRITE GAP

[75] Inventors: Roger R. Stromsta, Palo Alto; John H. Miller, III, San Jose; Harry J. Carlson, Jr., Morgan Hill, all of Calif.

[73] Assignee: Xerox Corporation, Stamford, Conn.

[21] Appl. No.: 191,961

[22] Filed: Sep. 29, 1980

[51] Int. Cl.³ .................... G11B 5/27; G11B 21/00
[52] U.S. Cl. .................................. 360/121; 360/66; 360/118
[58] Field of Search .............. 360/121, 118, 66, 76, 360/122, 125

[56] References Cited
U.S. PATENT DOCUMENTS 4,110,804  8/1978  Castrodale et al. ............ 360/121
4,300,174  11/1981  Harman et al. ................. 360/66

FOREIGN PATENT DOCUMENTS 44-17679  8/1969  Japan .
52-142507  11/1977  Japan .

Primary Examiner—Alfred H. Eddleman

[57] ABSTRACT

A magnetic head assembly is disclosed comprising a housing having a front surface including a slot formed therein and extending through the housing; a read/write transducer positioned within the slot and including a read/write gap of predetermined dimensions substantially in the plane of the front surface, the lengthwise extent of the read/write gap being skewed with respect to a first axis running perpendicular to a second, principal axis of the housing; and a pair of erase transducers positioned within the slot on either side of the read/write transducer, each erase transducer including an erase gap of predetermined dimensions substantially in the plane of the front surface, each erase gap being positioned on the opposite side of the first axis from the read/write gap.

9 Claims, 11 Drawing Figures

MAGNETIC HEAD ASSEMBLY WITH SKEWED READ/WRITE GAP

BACKGROUND OF THE INVENTION

This invention relates to magnetic head assemblies and, more particularly, to magnetic head assemblies having a read/write transducer and a pair of erase transducers.

Magnetic head assemblies have long been used for reading and writing data on magnetic recording surfaces, such as those which appear on magnetic recording disks, both rigid and flexible. In flexible disk drives, the magnetic head assembly normally contacts or is in close proximity to the recording surface during reading and writing. In the case of contacting magnetic head assemblies, a compliance member is provided in the disk drive for assuring continuous contact during rotation of the recording disk about its axis.

In order to define guard bands between adjacent data tracks written by the magnetic head assemblies used in flexible disk drives, and to reduce noise in such guard bands when the data is read back, a pair of erase transducers are positioned on either side of the read/write transducer. The erase transducers are normally also positioned rearwardly of the read/write transducer relative to the path of movement of the magnetic recording surface during rotation thereof in the disk drive. Such pair of erase transducers are oftentimes referred to as "tunnel erase" transducers, as they serve to erase the edges of each data track just after it has been written by the read/write transducer.

In present flexible disk drives, the magnetic head assembly is normally positioned with the lengthwise extent of its read/write gap lying along a line which is parallel to a radial line from the axis of rotation of the disk and which intersects such axis. Additionally, the erase gaps generally lie along a line parallel to such radial line, since they are formed on the head assembly parallel lengthwise to the read/write gap. In view of this relationship, it was found that, during erasure of the edges of a just written data track, a portion of the data track itself would be erased by one erase transducer, while the other erase transducer would not completely erase previous data and noise adjacent to the other side of the track, thereby leaving remnant data and noise adjacent such other side. These adverse effects are caused by the curvature of the track, and become more pronounced as the radius of the track decreases.

At least one manufacturer of flexible disk drives has attempted to overcome this problem by mounting the head assembly in the drive such that it is rotated by an amount sufficient to compensate for the curvature of the tracks. While this approach may reduce the adverse track curvature effects above described, it necessarily introduces undesirable azimuth errors, since the lengthwise extent of the read/write gap would no longer be along a line intersecting the axis of rotation of the disk.

It would be desirable, therefore, to provide a magnetic head assembly having a read/write transducer and a pair of erase transducers wherein the adverse track curvature effects as above described are substantially reduced, if not eliminated, while not thereby introducing azimuth or other errors.

SUMMARY OF THE INVENTION

In accordance with the invention, a magnetic head assembly is provided comprising a read/write transducer including a read/write gap, the lengthwise extent of said read/write gap being skewed with respect to a first axis running perpendicular to a second, principal axis of said assembly; and a pair of erase transducers positioned on either side of said read/write transducer, each erase transducer including an erase gap positioned on the opposite side of said first axis from said read/write gap.

By then mounting the head assembly to a movable carriage within a recording device, such as disk drive, such that, during movement of the carriage, the lengthwise extent of the read/write gap continuously lies along a line which is parallel to a radial line extending from the axis of rotation of the disk and which intersects such axis of rotation, the two erase gaps will be effectively rotated in a direction compensating for the curvature of the disk. If the skew angle of the read/write head relative to the aforementioned first axis is carefully chosen bearing in mind the distance between and dimensions of the erase gaps and the read/write gap, the magnitude of the normal fringing fields of the erase gaps, and the minimum and maximum radii of tracks on the disk, this technique can substantially reduce, if not eliminate, the adverse track curvature effects described above. Additionally, since the read/write gap continuously lies along a line intersecting the axis of rotation of the disk, no azimuth errors will be introduced.

BRIEF DESCRIPTION OF THE DRAWINGS

These and other aspects and advantages of the invention will be described below with respect to the accompanying drawings, wherein.

DESCRIPTION OF THE PREFERRED EMBODIMENT

Figure 1:
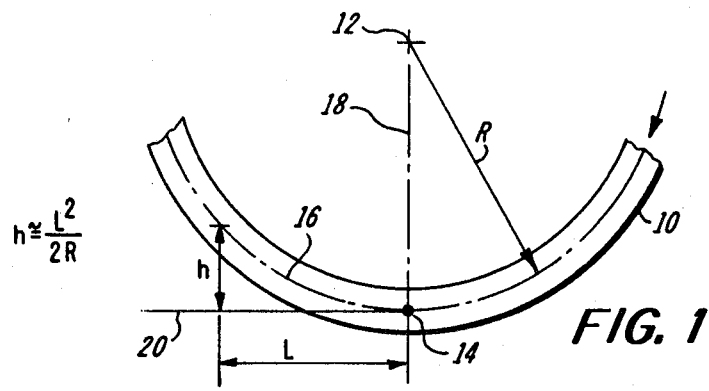
FIG. 1 is a representation of the so-called "track curvature effect."

Before describing the presently preferred magnetic head assembly, it would be helpful to review in a bit more detail the nature and character of the adverse track character effects alluded to above. Referring to FIG. 1, an exaggerated representation of a portion of a single track 10 on a flexible disk recording surface is shown, with the axis of rotation of the disk being depicted at point 12. As is conventional, a typical track width on a flexible disk recording surface is between about 0.006 inch and 0.021 inch, whereas the radii of curvature of the data tracks 10 typically range between 1.30 inches and 3.6 inches. Point 14 indicates the intersection of the centerline 16 of the track 10, at a radius "R", and a radial line 18 extending from the axis of rotation 12 of the disk. As shown in FIG. 1, as the distance "L" along a line 20 tangent to the centerline 16 and intersecting the radial line 18 at point 14 increases, the distance "h" from the centerline 16 to the line 20 increases in accordance with the following equation:

$$h \cong (L^2/2R)$$

Figure 2:
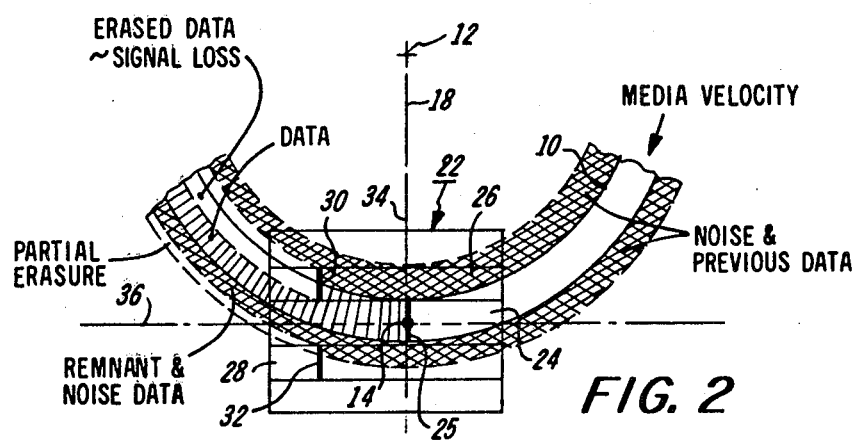
FIG. 2 is a representation of the relative position of a prior art magnetic head assembly of the tunnel erase type and an overlying magnetic recording disk.

The result of this track curvature effect on a conventional tunnel core type magnetic head assembly 22 is shown in FIG. 2, where the magnetic head assembly 22 is diagrammatically represented. As shown, the prior art magnetic head assembly 22 includes a read/write transducer 24 including a read/write gap 25 formed therein, as well as a pair of erase transducers 26 and 28 positioned on either side of the read/write transducer 24. The pair of erase transducers include a respective pair of erase gaps 30 and 32. The read/write gap 25 is normally positioned with its lengthwise extent lying along an axis 34 of the magnetic head assembly 22 which is perpendicular to a principal axis 36 of the magnetic head assembly 22. The erase gaps 30 and 32 are each normally positioned "downstream" of the read/write gap 25 relative to the direction of rotational travel of the disk, to thereby erase previous data and noise on either side of a track of newly recorded data by the read/write gap 25. Typically, the distance between the erase gaps 30 and 32 and the read/write gap or axis 34 is about 0.036 inch.

The prior art magnetic head assembly 22 of FIG. 2 is normally mounted in a disk drive (not shown) such that the axis 34 of the assembly 22, which the lengthwise extent of the read/write gap 25 lies along, is parallel to the radial line 18 of the disk and intersects the axis of rotation 12 of the disk. In this manner, the lengthwise extent of the read/write gap 25 lies along a line that is parallel to the radial line 18 and intersects the axis of rotation 12. This relationship insures there will be no azimuth error, which would result if the read/write gap 25 did not lie along a line intersecting the axis of rotation 12 of the disk.

Notwithstanding the absence of azimuth error, the prior art magnetic head assembly 22, as typically mounted in the manner depicted in FIG. 2, is subject to significant signal loss on one side of a newly recorded track and noise on the other side, especially in the case of floppy disks having diameters 8 inches or less. FIG. 2 clearly shows the erase transducer 26 erasing through its erase gap 30 a substantial portion of the newly recorded data track 10 written by the read/write transducer 24 through its read/write gap 25. In addition, the erase transducer 28 through its erase gap 32 fails to erase previous data and noise closely adjacent the other side of the track 10. It is clear that the greater the distance "L" and thus "h" (FIG. 1), the greater proportion of the track 10 will be improperly erased by the erase transducer 26, and the more remnant data and noise will be left on the other side of the track by the incomplete erasure of the erase transducer 28.

We have attempted a number of approaches to reduce or eliminate these adverse track curvature effects.

One way is by mounting the magnetic head assembly 22 such that the gaps 25, 30 and 32 are all shifted to the right from the positions shown in FIG. 2. While this will reduce the erase errors noted above by the erase transducers 26 and 28, the fact that the read/write gap 26 would no longer intersect the axis of rotation 12 of the disk would introduce azimuth and index timing errors, which are equally undesirable.

Another way of reducing track curvature effects, which has already been discussed above, is by mounting the magnetic head assembly 22 such that the gaps 25, 30 and 32 are rotated clockwise about the intersection point 14 from the positions shown in FIG. 2 an amount sufficient to compensate for the track curvature relative to the erase gaps 30 and 32. However, and as pointed out above, this approach also introduces undersirable azimuth errors, since the lengthwise extent of the read/write gap 22 would no longer lie along a line intersecting the axis of rotation 12 of the disk.

Figure 3:
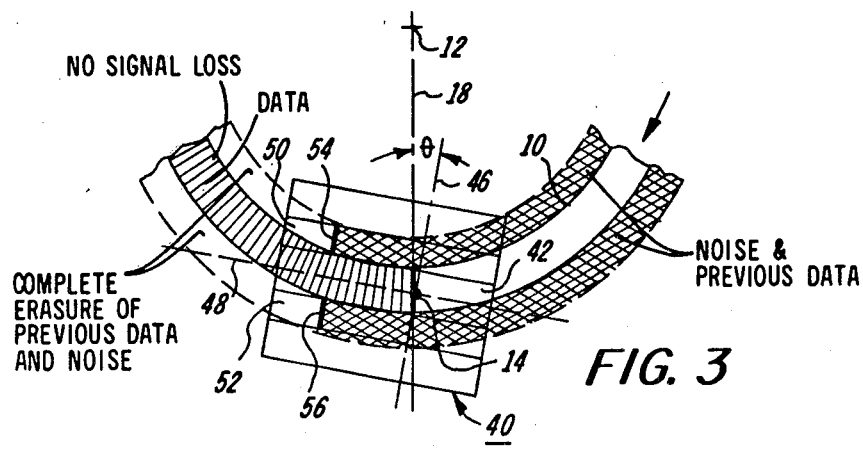
FIG. 3 is a representation of the relative position of a magnetic head assembly of the present invention and an overlying magnetic recording disk.
Figure 4:
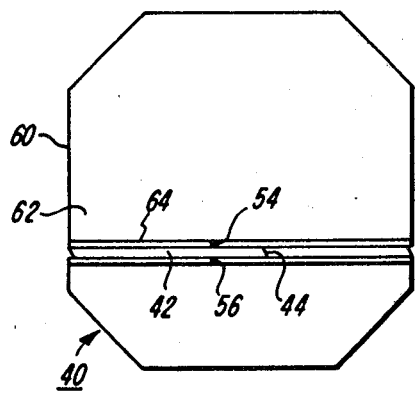
FIG. 4 is a front elevational view of a presently preferred magnetic head assembly of the invention.
Figure 5:
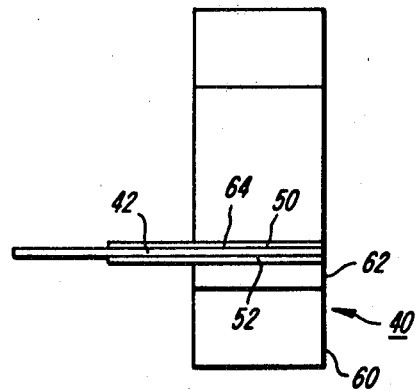
FIG. 5 is a side elevational view of the magnetic head assembly of FIG. 4.

The presently preferred approach, which substantially reduces, if not eliminates, undesired track curvature effects, and which does not thereby introduce azimuth or timing errors, is shown diagramatically in FIG. 3. As shown, a new magnetic head assembly 40 is provided including a read/write transducer 42 having a read/write gap 44. Unlike the read/write gap 25 of the head assembly 22 (FIG. 2), the gap 44 is skewed relative to an axis 46 running perpendicular to a principal axis 48 of the head assembly 40. The magnetic head assembly 40 further includes a pair of tunnel erase transducers 50 and 52, each substantially idential to transducers 26 and 28 of head assembly 22. Thus, the erase transducers 50 and 52 include a respective pair of erase gaps 54 and 56, the lengthwise extent of each preferably being parallel with the axis 46. Further, the gaps 54 and 56 are each preferably the same distance from the axis 46.

By mounting the head assembly 40 to a linearly movable carriage 102 (FIG. 11) such that, during movement of the carriage, the lengthwise extent of the read/write gap 44 continuously lies on a line parallel to the radial line 18 and intersecting the axis of rotation 12 of the disk, the erase gaps 54 and 56 will be effectively rotated about the intersection point 14 in a clockwise direction thereby compensating for the curvature of the disk. By carefully selecting the skew angle φ in relationship to the dimensions of the gaps 44, 54 and 56, the distance between the two erase gaps 54 and 56 and the read/write gap 44, the magnitude of the normal fringing fields of the erase gaps 54 and 56, and the minimum and maximum radii of the tracks 10 on the disk, it is possible by the above approach to substantially reduce, if not eliminate, track curvature effect errors of the type described above, while not introducing any azimuth or timing errors. As shown in FIG. 3, the erase gap 54 erases substantially an area only inside of the track 10, whereas the erase gap 56 erases substantially an area only outside of the track 10.

Reference is now made to FIGS. 4–10, where a presently preferred structure for the magnetic head assembly 40 of the invention will be described. The assembly 40 is comprised of a slider or housing 60 fabricated of a non-magnetic material, such as a ceramic material. The housing 60 has a front bearing surface 62 (best shown in FIGS. 5 and 6) which is adapted to contact a flexible recording disk (not shown). As will be made clear below, the basic concepts of the invention as described with respect to FIG. 3 above can equally well be employed in magnetic head assemblies primarily adapted to ride an air bearing adjacent a rigid recording disk. The specific magnetic head assembly 40 as shown in FIGS. 4–10 is presently preferred for flexible disk applications.

The magnetic head assembly 40 includes an elongated slot 64 formed in the front bearing surface 62 of the housing 60 and extending through the housing. Mounted in the slot 64 is the read/write transducer 42, as well as the pair of erase transducers 50 and 52, which are positioned on either side of the read/write transducer 42. The read/write transducer 42 includes the read/write gap 44 skewed in the manner and at an angle as discussed above, whereas the pair of erase transducers 50 and 52 include the respective pair of erase gaps 54 and 56, also positioned as described above with respect to FIG. 3.

Figure 6:
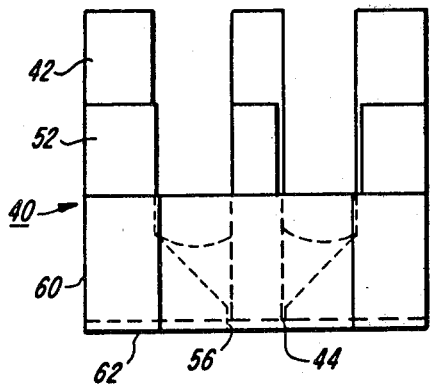
FIG. 6 is a top plan view of the magnetic head assembly of FIG. 4.
Figure 7:
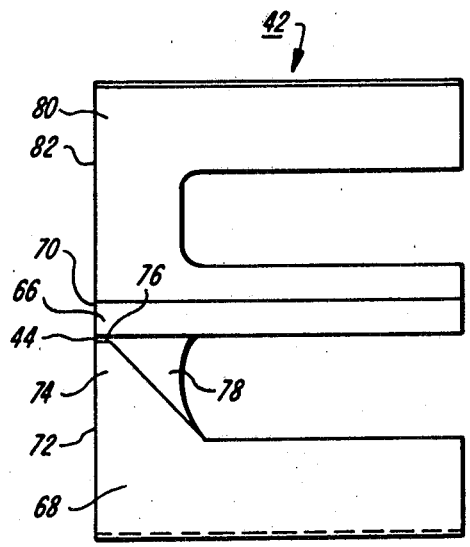
FIG. 7 is an enlarged view of the read/write core as shown in FIG. 6.
Figure 8:
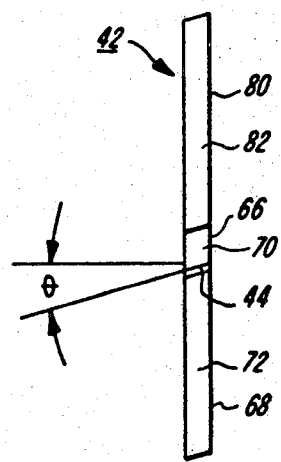
FIG. 8 is a front elevational view of the read/write transducer of FIG. 7.

Referring now to FIGS. 6–8, the read/write transducer 42 is comprised of a pair of pole pieces 66 and 68 fabricated of a magnetic material, such as ferrite. The pole pieces 66 and 68 are spaced apart at their front bearing surfaces 70 and 72 to define the read/write gap 44. Preferably, the read/write gap has a width approximately about 85 microinch.

The read/write transducer 42 is mounted in the slot 64 such that the front surfaces 70 and 72 of the pole pieces 66 and 68 are substantially coplanar with the front bearing surface 62 of the housing 60.

As shown in FIG. 7, the pole piece 68 has a horned portion 74, the top 76 of which is spaced adjacent the pole piece 66 to define the read/write gap 44. As is conventional, the pole pieces 66 and 68 are bonded together by melting a glass rod (not shown) between the horned portion 74 of the pole piece 68 and the pole piece 66. The resultant glass bond 78 is shown in FIG. 7, where it will be noted that the glass has infiltrated the read/write gap 44 during the melting process. The pole piece 66 is itself bonded by glass to a non-magnetic (e.g., ceramic) core element 80 which has a front surface 82 coplanar with the front surfaces 70 and 72 of the pole pieces 66 and 68.

The structure of each of the erase transducers 50 and 52 is preferably identical, and so only the erase transducer 52 will be described in detail with respect to FIGS. 9 and 10. As shown, the erase transducer 52 is comprised of a pair of pole pieces 84 and 86 fabricated of a magnetic material, such as ferrite. The pole pieces 84 and 86 are spaced apart at their front bearing surfaces 88 and 90 to define the erase gap 56. Preferably, each of the erase gaps 54 and 56 has a width of approximately about 100 microinch. The erase transducer 52, as well as the erase transducer 50, are mounted within the slot 64 such that the front surfaces 88 and 90 of the pole pieces 84 and 86 are substantially coplanar with the front bearing surface of the housing 60.

Figure 9:
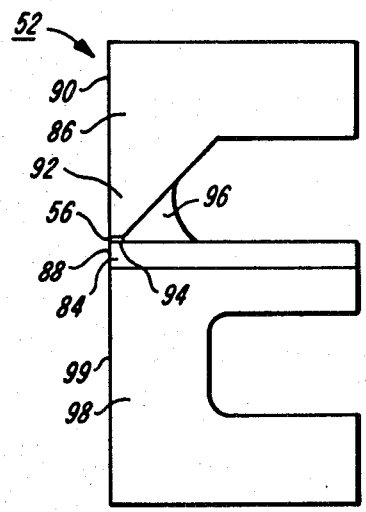
FIG. 9 is an enlarged view of one of the pair of erase cores as shown in FIG. 6.
Figure 10:
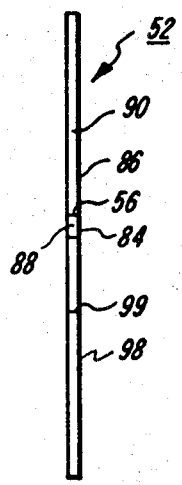
FIG. 10 is a front elevational view of the erase transducer of FIG. 9.

As shown in FIG. 9, the pole piece 86 has a horned portion 92, the top 94 of which is spaced adjacent the pole piece 84 to define the erase gap 56. As is the case with the read/write transducer 42, the pole pieces 84 and 86 are bonded together by melting a glass rod between the horned position 92 of the pole piece 86 and the pole piece 84. The resultant glass bond 96 is shown. The pole piece 84 is also glass bonded to a non-magnetic (e.g., ceramic) core element 98, the front surface 99 of which is coplanar with the front surfaces 88 and 90 of the pole pieces 84 and 86.

Figure 11:
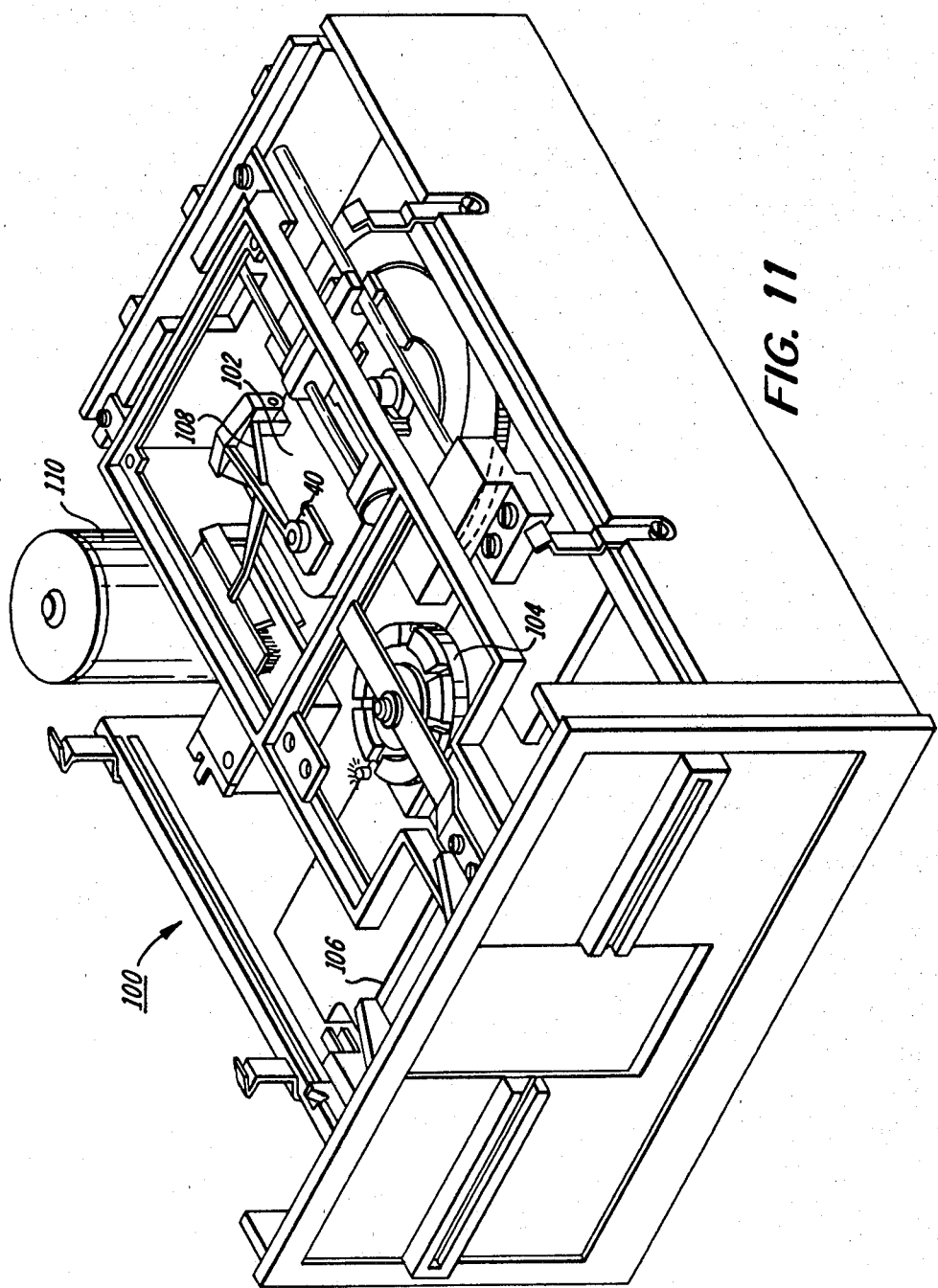
FIG. 11 is a perspective view of an exemplary recording device (i.e., a disk drive) incorporating the magnetic head assembly of FIGS. 4–10 mounted in the manner represented in FIG. 3.

Reference is now made to FIG. 11, where an exemplary recording device (i.e., a flexible disk drive 100) incorporating the magnetic head assembly 40 of the invention is shown. The head assembly 40 is mounted by suitable means (not shown) to a linearly movable carriage 102 such that the gaps 44, 54 and 56 will be positioned in the manner depicted diagrammatically in FIG. 3. The carriage 102 is itself movable by means (also not shown) such that the read/write gap 44 follows the radial line 18 during movement toward and away from the axis of rotation 12 of a disk mounted in the drive 100. Such a disk would be mounted about a drive hub (not shown) by a conventional disk clamping assembly 104 operated by a door loading mechanism 106 in a known manner. The drive hub is itself rotated by a drive motor 110 to cause rotation of the hub and a mounted disk about its axis of rotation 12 (FIG. 3). Compliance of a disk recording surface against the magnetic head assembly 40 is assured by a compliance member 108 biased in the direction of the assembly 40.

Although the invention has been described with respect to a presently preferred embodiment, it will be readily apparent to those skilled in the art the various modifications, substitutions, etc. may be made without departing from the spirit and scope of the invention as defined in and by the following claims. For example, the magnetic head assembly of the invention may be used in any recording device using magnetic recording media, and not just the single-side exemplary flexible disk drive 100 shown in FIG. 11. For example the magnetic head assembly of the invention could equally well be used in double-sided flexable disk drives, as well as in single or double-sided rigid disk drives.

What is claimed is:

1. A magnetic head assembly for a disk drive, said head assembly comprising
   a read/write transducer having a read/write gap extending lengthwise along an azimuth alignment axis for said head assembly, said alignment axis being skewed at a predetermined angle with respect to a second axis, said second axis perpendicularly intersecting a principal axis of said head assembly within said read/write gap; and
   a pair of erase transducers disposed on opposite sides of said read/write transducer, said erase transducers having respective erase gaps extending lengthwise in substantially equidistantly displaced parallel relationship with respect to said second axis, said skew angle being selected to compensate for the displacement of said erase gaps from said second axis, whereby said erase transducers are oriented to create substantially constant radius guard bands on either side of any data track written by said read/write transducer.

2. The magnetic head assembly of claim 1 wherein said erase gaps are substantially aligned lengthwise with each other and are displaced rearwardly of said read/write gap to create said guard bands after said data track is written.

3. The magnetic head assembly of claim 2 wherein said head assembly further includes a non-magnetic slider for supporting said read/write transducer and said erase transducer;
   said slider has a face for compliantly engaging a flexible magnetic recording medium, and
   said read/write gap and said erase gaps are substantially flush with said face.

4. The magnetic head assembly of claim 2 wherein said head assembly further includes a non-magnetic housing for supporting said read/write transducer and said erase transducers;

said housing has a face for riding on an air bearing adjacent a magnetic recording medium, and said read/write gap and said erase gaps are substantially flush with said face.

5. In a disk drive having drive means for rotating a magnetic recording disk about a predetermined axis of rotation, a magnetic head assembly for writing data on and reading data from said disk, and actuator means for translating said head assembly radially relative to said axis of rotation; the improvement to said head assembly comprising a read/write transducer having a read/write gap extending lengthwise substantially at a zero azimuth angle relative to said axis of rotation, said read/write gap intersecting a first axis at a predetermined skew angle, said first axis being perpendicular to a principal axis of said head assembly a pair of erase transducers disposed on opposite sides of said read/write transducer, said erase transducers having respective erase gaps extending lengthwise in displaced substantially parallel relationship with respect to said first axis, the skew angle of said read/write gap being selected to orient said erase transducers to create substantially constant radius guard bands on either side of any data track written on said disk by said read/write transducer.

6. The improvement of claim 5 wherein said erase gaps are substantially equidistantly displaced from said first axis.

7. The improvement of claim 6 wherein said erase gaps are substantially aligned lengthwise with each other and are displaced rearwardly of said read/write gap to create said guard bands after said data track is written.

8. The improvement of claim 7 wherein said head assembly further includes a non-magnetic slider for supporting said read/write transducer and said erase transducers, said slider has a face for compliantly engaging said recording disk, and said read/write gap and said erase gaps are substantially flush with said face.

9. The improvement of claim 7 wherein said head assembly further includes a non-magnetic housing for supporting said read/write transducer and said erase transducers, said housing has a face for riding on an air bearing adjacent said recording disk, said read/write gap and said erase gaps are substantially flush with said face.

* * * * *